H. H. GILCHRIST.
CORN-UNCOVERER.
No. 170,726.  Patented Dec. 7, 1875.
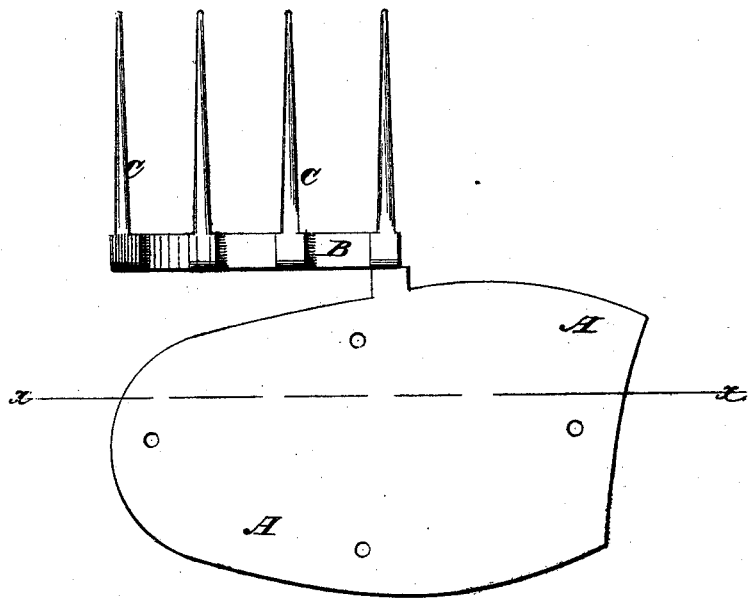
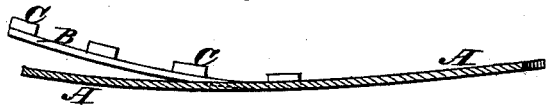

UNITED STATES PATENT OFFICE.

HUGH H. GILCHRIST, OF SWAN CREEK, ASSIGNOR OF ONE-HALF HIS RIGHT TO JOHN J. WORDEN, OF YOUNGSTOWN, ILLINOIS.

IMPROVEMENT IN CORN-UNCOVERERS.

Specification forming part of Letters Patent No. 170,726, dated December 7, 1875; application filed July 24, 1875.

*To all whom it may concern:*

Be it known that I, HUGH H. GILCHRIST, of Swan Creek, in the county of Warren and State of Illinois, have invented a new and useful Improvement in Corn-Uncoverer, of which the following is a specification:

Figure 1 is a top view of my improved device. Fig. 2 is a section of the same taken through the line $x\,x$, Fig. 1.

Similar letters of reference indicate corresponding parts.

The object of this invention is to furnish an improved device for attachment to a plowman's foot to enable him, without stopping his team, to uncover the corn that has been covered or partly covered by the soil thrown by the plow or cultivator, and straighten it up, freeing its leaves from the soil, and which shall be simple in construction and convenient in use.

The invention consists in the combination of the plate, the bar, and the prongs with each other, as hereinafter fully described, to adapt the device for attachment to the plowman's foot, as and for the purpose set forth.

A is a plate, which is made of any suitable metal, and of about the shape of a half-sole. The plate A has a number of holes formed through it to receive the screws or rivets by which it is secured to the sole of a plow-shoe or moccasin.

The plate A may be attached to the right or to the left foot. The one shown in the drawing is intended for the right foot.

Upon the outer edge of the plate A is formed, or to it is attached, the rear end of a bar, B, which projects forward, and has four or more outwardly-projecting prongs or fingers, C, formed upon or attached to it, at such a distance apart as will allow the stalks and leaves of the corn to be drawn through between them to raise said leaves and stalks above the soil and straighten them, while allowing the soil to pass through, so as not to uncover the weeds.

In using the device, the plowman, when he sees that a hill of corn has been partially or wholly covered with soil, by a slight outward movement of his foot passes the prongs C beneath the corn, and, as he raises his foot in taking the next step, the prongs C, as they move upward, straighten up the stalks and leaves of the corn, freeing them from the soil.

Having thus described my invention, I claim as new and desire to secure by Letters Patent—

The combination of the plate A, bar B, and prongs C with each other, substantially as herein shown and described, to adapt the device for attachment to the plowman's foot, as and for the purpose set forth.

HUGH HECTOR GILCHRIST.

Witnesses:
JOHN R. STILES,
M. L. STILES.